United States Patent
Schuhen

(10) Patent No.: US 8,352,141 B2
(45) Date of Patent: Jan. 8, 2013

(54) METHOD FOR ACTUATING A CLUTCH

(75) Inventor: Michael Schuhen, Buehlertal (DE)

(73) Assignee: Schaeffler Technologies AG & Co., KG, Herzogenaurach (DE)

( * ) Notice: Subject to any disclaimer, the term of this patent is extended or adjusted under 35 U.S.C. 154(b) by 0 days.

(21) Appl. No.: 13/492,655

(22) Filed: Jun. 8, 2012

(65) Prior Publication Data
US 2012/0245813 A1    Sep. 27, 2012

Related U.S. Application Data

(63) Continuation of application No. PCT/DE2010/001386, filed on Nov. 29, 2010.

(30) Foreign Application Priority Data

Dec. 10, 2009    (DE) .......................... 10 2009 057 831

(51) Int. Cl.
G06F 7/00    (2006.01)

(52) U.S. Cl. ................. 701/67; 701/51; 701/61; 701/66; 701/87; 701/95; 701/105; 701/110; 475/43; 475/65; 475/67; 475/86; 475/95; 477/57; 477/62; 477/70; 477/64; 477/68

(58) Field of Classification Search .................... 701/66, 701/67, 51, 61, 87, 95, 105, 110; 477/57, 477/62, 70, 64, 68, 75; 475/43, 65, 67, 86, 475/95, 99
See application file for complete search history.

(56) References Cited

U.S. PATENT DOCUMENTS

| 3,727,191 A | | 4/1973 | McGee |
| 5,379,367 A | * | 1/1995 | Song .............................. 700/52 |

FOREIGN PATENT DOCUMENTS

| DE | 3908844 | 9/1990 |
| DE | 102004037708 | 3/2005 |

* cited by examiner

*Primary Examiner* — Redhwan k Mawari
(74) *Attorney, Agent, or Firm* — Simpson & Simpson, PLLC

(57) ABSTRACT

A method for actuating a clutch in the drive train of a motor vehicle, including: generating a respective position setpoint for each predetermined target interval to actuate the clutch; in each predetermined target interval, actuating the clutch in a plurality of predetermined controller sampling intervals; discretizing a respective position setpoint change into a plurality of intermediate position setpoints; determining a number of intermediate position setpoints in the plurality of intermediate position setpoint depending on the ratio of the target interval to the controller sampling interval; and specifying the respective position setpoint changes in steps to actuate the clutch.

7 Claims, 2 Drawing Sheets

METHOD FOR ACTUATING A CLUTCH

CROSS-REFERENCE TO RELATED APPLICATIONS

This application is filed under 35 U.S.C. §120 and §365(c) as a continuation of International Patent Application No. PCT/DE2010/001386 filed Nov. 29, 2010 which application claims priority from German Patent Application No. 10 2009 057 831.5 filed Dec. 10, 2009, which applications are incorporated herein by reference in their entirety.

TECHNICAL FIELD

The invention relates to a method for actuating a clutch in the drivetrain of a motor vehicle. To move the clutch (in the context of this document, moving the clutch means actuating the clutch by movement), a position setpoint is generated at predetermined target intervals, and the clutch is actuated at a number of predetermined controller sampling intervals upon each target interval.

In motor vehicle transmissions, the clutch position controller receives e.g. from the clutch control unit, target positions for moving the clutch that are calculated from the desired clutch target torque. The target positions are updated at predetermined target intervals. If the clutch position controller operates at short controller sampling intervals, the target positions for controlling the clutch, discretized in the target intervals, are represented in the clutch position controller operating at controller sampling intervals as a sequence of setpoint jumps. Particularly when the clutch actuators are designed to be highly dynamic, this can cause oscillations in the control loop, especially oscillations in the control voltage. This subjects the hardware, especially the EC motor of the clutch actuator, to a greater load and increased wear.

BACKGROUND

DE 10 2004 037 708 A1 proposes a method for controlling and/or regulating at least one clutch of a transmission of a vehicle having an engine in a drivetrain. The clutch is actuated depending on the engine speed that is to be determined. The position of the clutch can simultaneously be regulated by such a speed regulation. The end value is specified directly as the setpoint as, for example, when engaging the clutch up to a desired target torque. The disadvantage of this method is that an additional link between the position regulation and speed regulation is required and is therefore very complex. In addition, the speed of the clutch actuator motor must be easily measurable in such a method, particularly at low speeds. This requires additional effort when designing the associated software, especially the sensors and the software associated with the hardware.

BRIEF SUMMARY

The object of the invention is therefore to present a method for actuating a clutch in which problems arising from different runtimes in the control loop of the clutch position control can be easily avoided.

The method discretizes a position setpoint change specified in a respective current target interval into a number of intermediate position setpoints that are determined depending on the ratio of the target interval to the controller sampling interval. The method specifies the intermediate position setpoints in steps to actuate the clutch. In this manner, the position setpoint changes requested in the target intervals can each be spread into a sequence of intermediate position setpoints discretized in the controller sampling intervals and continuously specified to actuate the clutch. That is, the intermediate position setpoints are updated at each controller sampling interval, thereby easily avoiding oscillations in the clutch control loop, unnecessary stress on the hardware, and problems with the clutch actuator.

In the current target interval, the current position setpoint change can easily be determined from the difference between the current position setpoint specified in the current target interval, and the position setpoint specified in the target interval preceding the current target interval.

It is advantageous to distribute the current position setpoint change over a number of intermediate steps corresponding to the integral ratio of the target interval and controller sampling interval. The position change requested in the current target interval is divided into intermediate steps discretized in the controller sampling interval. The overall position change requested in the current target interval occurs, for example, in equivalent partial position changes ideally divided into motor increments discretized at the controller sampling interval.

The intermediate position setpoints discretized at the controller sampling interval in the respective intermediate step are, for example, determined by adding a position setpoint change with reference to the respective intermediate step to the intermediate position setpoint determined in the previous step. The position setpoint change with reference to the respective intermediate step is determined from the remainder of each remaining residual position setpoint change with reference to the remaining number of intermediate steps in the respective intermediate step. Each total is assigned as the intermediate position setpoint discretized in the controller sampling interval determined in the respective intermediate step.

The residual position setpoint change remaining in the respective intermediate step is, for example, calculated from the difference between the position setpoint generated in the current target interval and the intermediate position setpoint discretized in the controller sampling interval determined in each previous intermediate step. In the first intermediate step, the residual position setpoint change corresponds to the initially determined overall position setpoint change requested in the current target interval.

The first intermediate position setpoint discretized in the controller scanning interval is therefore, for example, determined in the first intermediate step by adding the remainder, with reference to the total number of intermediate steps, of the overall current position setpoint change in the target interval to the position setpoint generated in the target interval preceding the current target interval. Each total is assigned as the intermediate position setpoint discretized in the controller sampling interval determined in the first intermediate step.

In the last intermediate step, the last intermediate position setpoint discretized in the controller sampling interval corresponds to the position setpoint generated in the current target interval. The position setpoint change requested in the current target interval is achieved by specifying the position setpoint generated in the current target interval to actuate the clutch and the last intermediate step.

In the method according to the invention, a first step, for example, initially determines whether the amount of the current position setpoint change requested in the current target interval is greater than a predetermined minimum and less than a predetermined maximum. The method according to the invention is, for example, only executed when the amount lies within the predetermined range. The predetermined maximum and minimum can for example be selected so that large position changes or desired jumps in position are not suppressed, and unnecessary additional procedural changes are avoided when the required position changes are very small and there is no danger of an oscillation forming in the control loop, or when the control unit activation threshold is not reached.

In the first intermediate step, the maximum is, for example, first calculated by comparing the amount of the initially determined remainder of the position setpoint change with reference to the number of intermediate steps and the predetermined activation threshold of the clutch position controller. The previously determined maximum is added to the position setpoint generated in the target interval previous to the current target interval to determine the intermediate position setpoint discretized in the controller sampling interval. If the requested position changes are small, this ensures that the intermediate position setpoint determined at the controller sampling interval in the first intermediate step at least reaches the activation threshold of the clutch position controller.

BRIEF DESCRIPTION OF THE DRAWINGS

The following describes an example of the invention with reference to the accompanying figures in which.

DETAILED DESCRIPTION

Figure 1:
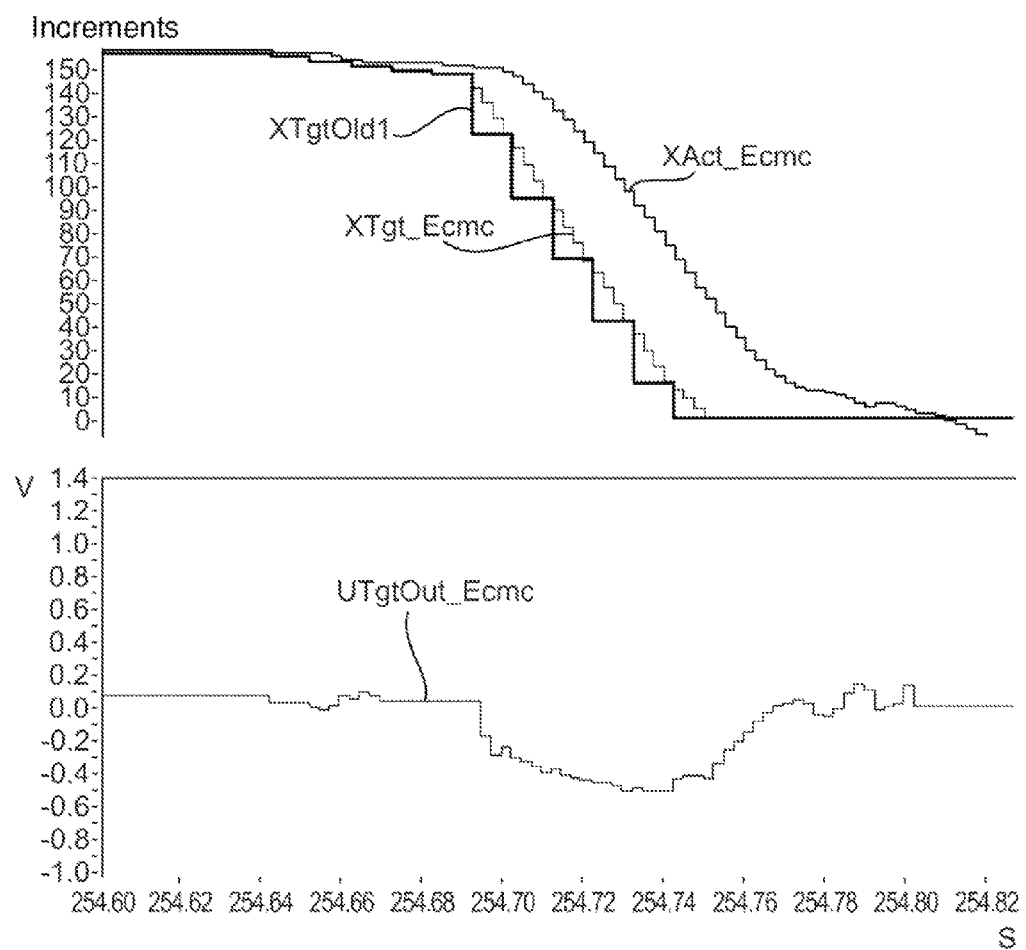
FIG. 1 shows an exemplary embodiment of characteristic of optimized position setpoints, characteristic of position setpoints detected by clutch position controls, and characteristic of actuation voltage of a clutch actuator over time.

FIG. 1 shows a two-part graph in which the top part shows an example of characteristic of position setpoints in curve XtgtOld1 to move an automated clutch. The position setpoints are calculated from the desired clutch torque to be transmitted by the clutch to the drivetrain of the motor vehicle and are generated, for example, by a clutch control unit, in a ramp, as position setpoints XTgtOld1 discretized in predetermined target intervals. Characteristic curve XAct_Ecmc reflects a clutch position controller operating at controller sampling intervals. Curve UTgtOut in the bottom part of the graph shows characteristic of actuation voltage which the clutch position controller uses to actuate the clutch control unit, a clutch actuator in this case, in a ramp to change position. The duration of the target interval and the controller sampling interval is predetermined depending on the hardware. In an exemplary embodiment, the duration of the target interval is specified in so-called 10 ms interrupts, and the duration of the controller sampling intervals is specified in so-called 2.5 ms interrupts.

With reference to the position setpoint characteristic XTgtOld1 discretized in 10 ms interrupts, an optimized position setpoint characteristic correspondingly discretized in controller sampling intervals, here for example in 2.5 ms interrupts, is shown in curve XTgt_Ecmc. The current overall position setpoint change in characteristic XTgtOld1 specified in the current 10 ms interrupt from the difference between the currently generated position setpoint and the position setpoint generated in the preceding 10 ms interrupt is broken up in each case into four intermediate position setpoints discretized into 2.5 ms interrupts corresponding to the integral ratio of the target interval and controller sampling interval and applied to the clutch position controller. The position setpoints are thereby updated every 2.5 ms corresponding to the controller sampling interval. In this manner, each change in position setpoint requested in the 10 ms interrupt is divided into four equivalent position changes discretized into 2.5 ms interrupts. As shown in the bottom graph of FIG. 1, the preceding reliably prevents jumps or oscillations in the characteristic of the control voltage UTgtOut of a clutch actuator motor.

Figure 2:
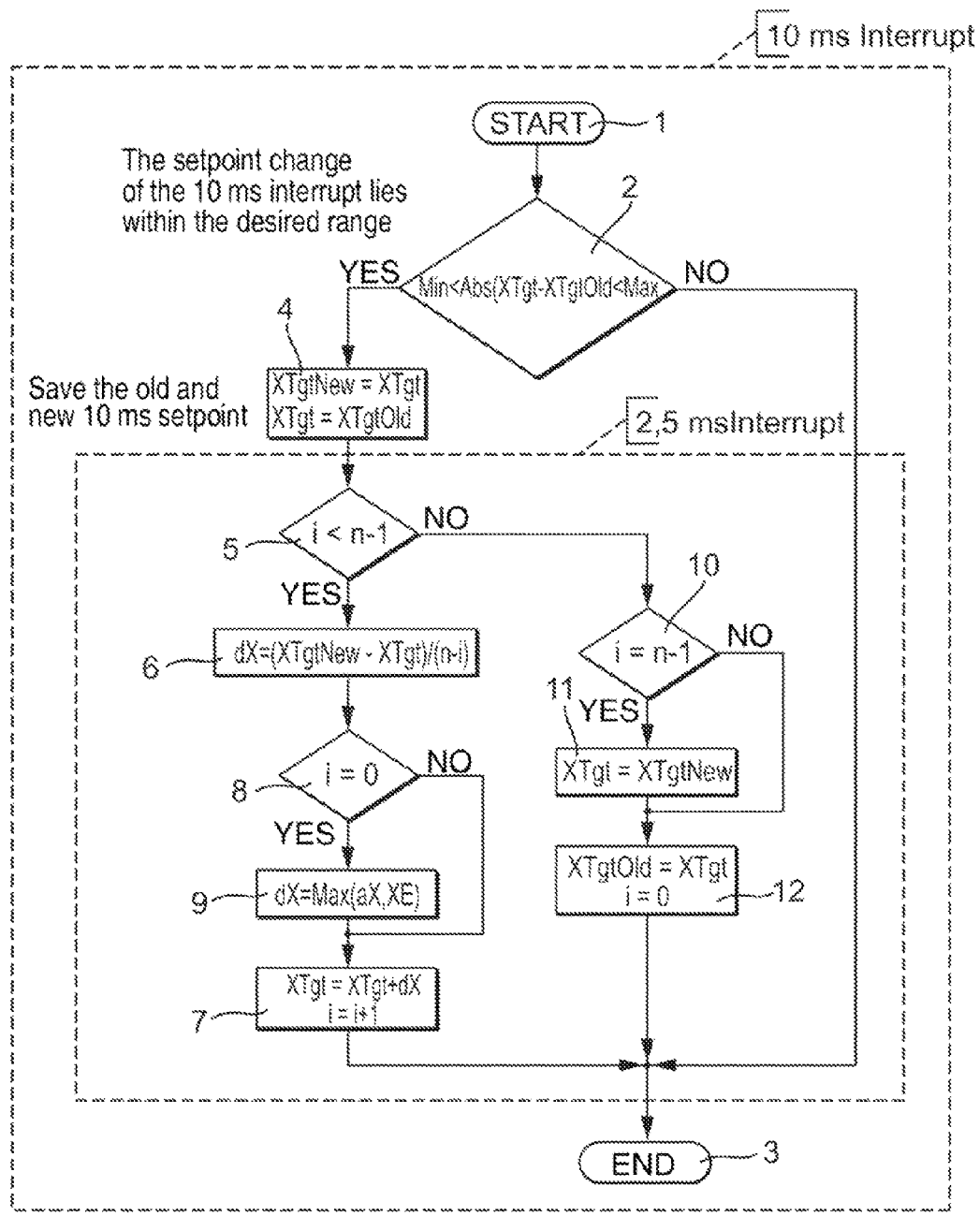
FIG. 2 is a schematic representation of an exemplary embodiment of a method for actuating a clutch.

FIG. 2 shows an example of a graph of characteristic of a method for actuating a clutch. Proceeding from a starting point 1, it is first determined in a branch 2 whether the position setpoint change lies within the desired range in the current 10 ms interrupt. The differential amount is calculated between the position setpoint XTgt specified in the current 10 ms interrupt and the actual position setpoint XTgtOld generated in the 10 ms interrupt proceeding the current 10 ms interrupt. A check occurs to see if this amount is greater than a predetermined minimum and smaller than a predetermined maximum. Position changes are thereby only taken into account starting at a predetermined minimum quantity and up to a predetermined maximum quantity. If the calculated change in the position setpoint does not lie within a predetermined range, the procedure is terminated at endpoint 3. If the change of the position setpoint lies within a predetermined range, the position setpoint XTgt generated in the current 10 ms interrupt is saved in block 4 as target position setpoint XTgtNew, and the actual position setpoint XTgtOld generated in the 10 ms interrupt preceding the current 10 ms interrupt is saved as XTgt.

The method continues in a predetermined number of "n" intermediate steps discretized into 2.5 ms interrupts. The overall position setpoint change that is requested based on the difference from the target position setpoint XTgtNew and the actual position setpoint XTgtOld in the current 10 ms interrupt is divided into "n" intermediate position setpoints discretized into 2.5 ms interrupts, and these are continuously applied sequentially to the clutch position controller in 2.5 ms intermediate steps. The number "n" of intermediate steps results from the integral ratio of the target interval to the controller sampling interval, for example in this case, corresponding to a ratio of 10 ms to 2.5 ms in four intermediate steps in which four intermediate position setpoints discretized into 2.5 ms interrupts are calculated and assigned in the respective 2.5 ms interrupt. To count the intermediate steps, an incremental runs from i=0 to i=n−1, in an exemplary embodiment i=0 to i=4−1=3, which is incremented by one in each intermediate step. In each 2.5 ms interrupt, there is first a check in branch 5 to see if the current increment counter "i" is less than n−1, that is, whether or not the method is in the last intermediate step. If, in the exemplary embodiment, the increment counter "i" is less than 3 in the current intermediate step, the method continues via the branch shown on the left side of the diagram, and the position setpoint change dX with reference to the current 2.5 ms interrupt is first determined in block 6. This is calculated from the remainder, with reference to the number of n−i intermediate steps remaining in the current intermediate step, of the residual position setpoint change remaining in the respective intermediate step. Each residual position setpoint change is calculated from the difference between the target position setpoint XTgtNew saved in the current 10 ms interrupt and the position setpoint XTgt saved in the step preceding the respective intermediate step.

The position setpoint change dX calculated in block 6 is added in block 7 to the position setpoint XTgt saved in the 2.5 ms interrupt in the preceding step. The total is then assigned as the intermediate position setpoint XTgt with reference to the current 2.5 ms interrupt. At the same time, the increment counter "i" is incremented by one, and the next 2.5 ms intermediate step is executed as described above.

According to the above-described procedure, the remainder, with reference to the number of four (n=4, i=0) intermediate steps, is calculated in the first 2.5 ms intermediate step in block 6 from the overall position setpoint change requested in the current 10 ms interrupt that was determined initially from the difference between the XTgtNew currently saved as the target position setpoint and the XTgtOld saved in the first intermediate step as the actual position setpoint. That is, the overall position setpoint change is divided by the total number of intermediate steps, and this quotient is calculated as the position setpoint change dX with reference to the first intermediate step.

In the following two intermediate steps (i=1, i=2), the respective residual position setpoint change is first calculated in block 6 from the difference between the currently saved target position setpoint XTgtNew and XTgt calculated in the previous intermediate step and currently saved as the 2.5 ms intermediate position setpoint. The remainder with reference to the number of n−i intermediate steps is calculated; that is, the residual position setpoint change is divided by the 4−1=3 or 4−2=2 intermediate steps, and this quotient is calculated as the position setpoint change dX with reference to the second or third intermediate step.

In the first 2.5 ms interrupt, when i=0, that is, when the method is in the first intermediate step of the 10 ms interrupt, the method runs through block 9 at branch 8 located between blocks 6 and 7. In block 9, the maximum amount is determined from the position setpoint change dX calculated in the first intermediate step and a predetermined activation threshold XE of the clutch position controller, and then dX is compared with the previously determined maximum. In the first intermediate step, the intermediate position setpoint XTgt determined in the first 2.5 ms interrupt then results in block 7 from the sum of the saved 10 ms actual position setpoint XTgtOld and the maximum previously determined in block 9. It is thereby ensured in the first intermediate step that a 2.5 ms position setpoint XTgt is specified in the first 2.5 ms interrupt, and the position setpoint change dX at least reaches the activation threshold XE of the clutch position controller.

In the following intermediate steps (i=1, i=2), the method proceeds directly to block 7 at branch 8. In block 7, the position setpoint change dX with reference to the respective intermediate step that was calculated in previous block 6 is added to the 2.5 ms intermediate position setpoint XTgt determined in the previous interrupt, and the sum is assigned as a new 2.5 ms intermediate position setpoint XTgt.

If the condition of increment counter i≤n−1 does not exist at branch 5, the method proceeds to the last intermediate step at the branch shown on the right side of the diagram. At another branch, there is first a security check to see if the condition of increment counter i=n−1 exists, i=3 in an exemplary embodiment, that is, a check to see if the method is actually in the last intermediate step. If this condition exists, the current target position setpoint XTgtNew saved in the 10 ms interrupt is assigned in another block 11 as the last 2.5 ms intermediate position setpoint XTgt. The position setpoint generated in the current 10 ms interrupt is thereby reached in the last 2.5 ms interrupt.

Finally, the current target position setpoint XTgtNew assigned in the last 2.5 ms interrupt is saved in block 12 as the new actual position setpoint XTgtOld for the new, subsequent 10 ms interrupt, the increment counter "i" is set to zero, and the method proceeds to endpoint 3.

If the condition i=n−1 is not satisfied at branch 10, block 11 is circumvented, and the intermediate position setpoint XTgt assigned in the previous 2.5 ms interrupt is saved in block 12 as the new actual position setpoint XTgtOld for the new, subsequent 10 ms interrupt, increment counter "i" is set to zero, and the method proceeds to endpoint 3.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

| List of reference numbers | |
| --- | --- |
| XTgtOld1 | Curve |
| XAct Ecmc | Curve |
| UTgtOut | Curve |
| XTgt_Ecmc | Curve |
| XE | Activation threshold |
| XTgt | Position setpoint |
| XTgtOld | Actual position setpoint |
| XTgtNew | Target position setpoint |
| dX | Position setpoint change |
| 1 | Starting point |
| 2 | Endpoint |
| 3 | Branch |
| 4 | Block |
| 5 | Branch |
| 6 | Block |
| 7 | Block |
| 8 | Branch |
| 9 | Block |
| 10 | Branch |
| 11 | Block |
| 12 | Block |

What I claim is:

1. A method for actuating a clutch in the drivetrain of a motor vehicle, comprising using a clutch position controller to:
    generate a respective position setpoint for each predetermined target interval in a plurality of predetermined target intervals;
    in each predetermined target interval, actuate the clutch in a plurality of predetermined controller sampling intervals;
    discretize a respective position setpoint change into a plurality of intermediate position setpoints;
    determine a number of intermediate position setpoints in the plurality of intermediate position setpoint depending on a ratio of each target interval to a predetermined controller sampling interval;
    specify the respective position setpoint changes in steps to actuate the clutch;
    in a first intermediate step, calculate a maximum by comparing an amount of a remainder of a respective position setpoint change with reference to a number of intermediate steps and a predetermined activation threshold of the clutch position controller; and,
    add a previously determined maximum to a respective position setpoint generated in a target interval previous to a current target interval to determine an intermediate respective position setpoint discretized in the controller sampling interval.

2. The method according to claim 1, further comprising, in a current target interval, using the clutch position controller to determine a current respective position setpoint change from a difference between a currently generated respective position setpoint and a respective position setpoint generated in a target interval preceding the current target interval.

3. The method according to claim 1, further comprising, using the clutch position controller to distribute a current respective position setpoint change over a plurality of intermediate steps corresponding to an integral ratio of the target interval and the controller sampling interval.

4. The method according to claim 1, further comprising using the clutch position controller to:
   discretize the plurality of intermediate position setpoints into a plurality of intermediate steps in the controller sampling interval; and,
   form each intermediate position setpoint by using a sum of a previously determined respective position setpoint and a remainder of a remaining residual respective position setpoint change with reference to a remaining number of intermediate steps in a respective intermediate step.

5. The method according to claim 1, further comprising using the clutch position controller to form a first discretized intermediate position setpoint in the controller scanning interval in a first intermediate step by using a sum of a respective position setpoint generated in a target interval preceding a current target interval, and a remainder, with reference to a number of intermediate steps, of a current respective position setpoint change.

6. The method according to claim 1, wherein an intermediate position setpoint discretized in the controller sampling interval in a immediately preceding intermediate step corresponds to a respective position setpoint generated in a current target interval.

7. The method according to claim 1, further comprising, using the clutch position controller to determine whether an amount of a respective position setpoint change is greater than a predetermined minimum and less than a predetermined maximum.

* * * * *